(12) United States Patent
Gruberman et al.

(10) Patent No.: US 9,787,823 B2
(45) Date of Patent: Oct. 10, 2017

(54) SYSTEM AND METHOD FOR REMOTELY CONTROLLING FEATURES OF WIRELESS MOBILE DEVICES

(71) Applicants: Randal Gruberman, Chicago, IL (US); Eric Carlton, Chicago, IL (US); James J. Hinton, Chicago, IL (US)

(72) Inventors: Randal Gruberman, Chicago, IL (US); Eric Carlton, Chicago, IL (US); James J. Hinton, Chicago, IL (US)

( * ) Notice: Subject to any disclaimer, the term of this patent is extended or adjusted under 35 U.S.C. 154(b) by 0 days.

(21) Appl. No.: 15/139,618

(22) Filed: Apr. 27, 2016

(65) Prior Publication Data
US 2016/0277560 A1    Sep. 22, 2016

Related U.S. Application Data

(63) Continuation-in-part of application No. 14/570,764, filed on Dec. 15, 2014, now Pat. No. 9,357,053,
(Continued)

(51) Int. Cl.
*H04W 4/00*    (2009.01)
*H04M 1/725*   (2006.01)
(Continued)

(52) U.S. Cl.
CPC .... *H04M 1/72569* (2013.01); *G06Q 10/1095* (2013.01); *G06Q 20/322* (2013.01); *G06Q 20/3221* (2013.01); *G06Q 20/3224* (2013.01); *G06Q 30/0201* (2013.01); *G08B 25/10* (2013.01); *H04L 5/005* (2013.01); *H04M 1/72572* (2013.01); *H04M 1/72577* (2013.01); *H04W 4/001* (2013.01); *H04W 4/02* (2013.01); *H04W 4/025* (2013.01); *H04W 4/043* (2013.01); *H04W 4/046* (2013.01); *H04W 8/245* (2013.01); *H04W 24/08* (2013.01); *H04W 76/02* (2013.01); *G06Q 50/12* (2013.01)

(58) Field of Classification Search
None
See application file for complete search history.

(56) References Cited

U.S. PATENT DOCUMENTS

7,975,048 B2 * 7/2011 Saunderson ........ H04L 12/4641
  370/336
8,817,761 B2   8/2014 Gruberman et al.
(Continued)

*Primary Examiner* — Afshawn Towfighi
(74) *Attorney, Agent, or Firm* — Husch Blackwell LLP (57) ABSTRACT

An apparatus including a plurality of wireless beacons carried by a wireless portable device, a wireless transceiver of the portable device that monitors a predetermined wireless spectrum and detects a signal from another of the plurality of wireless beacons, a processor of the portable device that decodes the detected beacon for an identifier including a sequence of bits, a processor of the portable device that correlates a content of the identifier with one of a plurality of programs of the portable device by matching the one or more bits of an identifier sequence of the one program with a content and location of one or bits of the identifier of the detected beacon and a processor of the portable device that interacts with another device that is directly physically adjacent the portable device via the beacon carried by the portable device and via execution of the one program.

20 Claims, 3 Drawing Sheets

Related U.S. Application Data which is a continuation of application No. 14/332,016, filed on Jul. 15, 2014, now Pat. No. 9,210,253, which is a continuation of application No. 13/219,857, filed on Aug. 29, 2011, now Pat. No. 8,817,761.

(51) Int. Cl.
| | |
|---|---|
| *H04W 8/24* | (2009.01) |
| *H04W 4/02* | (2009.01) |
| *G06Q 10/10* | (2012.01) |
| *G06Q 20/32* | (2012.01) |
| *G06Q 30/02* | (2012.01) |
| *H04L 5/00* | (2006.01) |
| *G08B 25/10* | (2006.01) |
| *H04W 4/04* | (2009.01) |
| *H04W 24/08* | (2009.01) |
| *H04W 76/02* | (2009.01) |
| *G06Q 50/12* | (2012.01) |

(56) References Cited

U.S. PATENT DOCUMENTS

| | | | |
|---|---|---|---|
| 8,866,673 B2 * | 10/2014 | Mendelson | G01C 21/206 |
| | | | 342/386 |
| 9,210,253 B2 | 12/2015 | Gruberman et al. | |
| 2006/0224693 A1 | 10/2006 | Gaidemak et al. | |
| 2009/0235354 A1 | 9/2009 | Gray et al. | |
| 2009/0320102 A1 | 12/2009 | Ou | |
| 2013/0089085 A1 * | 4/2013 | Ben-Moshe | H04W 4/08 |
| | | | 370/338 |
| 2014/0106735 A1 * | 4/2014 | Jackson | H04W 8/245 |
| | | | 455/419 |

* cited by examiner

SYSTEM AND METHOD FOR REMOTELY CONTROLLING FEATURES OF WIRELESS MOBILE DEVICES

CROSS-REFERENCE TO RELATED APPLICATIONS

This application is a continuation-in-part of and claims priority to U.S. application Ser. No. 14/570,764 filed on Dec. 15, 2014 which is a continuation of U.S. application Ser. No. 14/332,016 filed on Jul. 15, 2014, which is a continuation of and claims priority to U.S. application Ser. No. 13/219,857 filed Aug. 29, 2011, now U.S. Pat. No. 8,817,761. The above-identified Applications are hereby incorporated by reference.

FIELD OF INVENTION

The present invention relates generally to wireless mobile devices. More particularly, the present invention relates to systems and methods for remotely controlling features of wireless mobile devices.

BACKGROUND

Wireless mobile devices are virtually ubiquitous in current society. For example, many people carry a wireless mobile device while performing everyday activities such as working, traveling, running errands, and engaging in recreational activities. Wireless mobile devices can be any type of cellular mobile device, for example, a mobile phone, personal digital assistant, smart phone, and the like. However, wireless mobile devices are not so limited. For example, wireless mobile devices can also include wireless devices installed in and/or carried by an automobile.

Many wireless mobile devices include a variety of features, for example, RF transmissions, audible tones, backlit screens, cameras, recording, texting, and internet capabilities. However, in certain environments, it is advantageous and sometimes even required for some features of a wireless mobile device to be enabled or disabled.

For example, in an automobile, non-hands free features can distract drivers and endanger the lives of the driver as well as others in the vicinity. Therefore, it is advantageous to disable the non-hands free features and enable the hands free features of a driver's wireless mobile device. In some municipalities, laws even mandate the use of only hands free features, if any.

In other environments, for example, hospitals and airplanes, the Federal Communications Commission requires that devices do not emit any RF signals. Thus, the ability to transmit RF signals must be disabled. In still other environments, for example, movie theaters and classrooms, features such as audible tones, brightly lit backlit screens, cameras, and recording capabilities can interfere with people's concentration, privacy, and enjoyment of their surroundings. Thus, it is desirable to disable these features.

Wireless communication jammers that block all communication functions of wireless mobile devices are undesirable. Therefore, when located in environments where it is required or advantageous to enable or disable certain features of a wireless mobile device, it has traditionally been a user's responsibility to take the appropriate action. However, often users forget or do not care to enable or disable the prohibited features.

There is thus a continuing, ongoing need for systems and methods for remotely controlling features of wireless mobile devices.

SUMMARY

A system and method are provided in which executable software can run on the operating platform of a mobile device. When the software is running, the device can detect a signal, for example, a Media Access Control (MAC) Organizationally Unique Identifier (OUI) and a serial number in a received signal. Based on the signal and/or the MAC OUI and serial number in the signal and recognized by the device, the device can determine which device features should be modified.

However, before modifying any device features, the device can store a current state of the device features. Then, the device can modify the appropriate device features. When the device no longer recognizes the signal and/or the MAC OUI and serial number in the signal, for example, because the device is out of a certain range, the device can again modify the appropriate device features by returning those features to the previously stored current state.

One embodiment of the method described herein can include controlling features of a wireless mobile device. The method can include receiving a signal, for example, a signal with a predetermined MAC OUI and a serial number carried therein, determining if the features of the wireless mobile device are in a correct state in accordance with the received signal and/or the MAC OUI and serial number in the received signal, and when the features of the wireless mobile device are not in the correct state, modifying at least one feature of the wireless mobile device in accordance with the received signal, for example, the MAC OUI and serial number in the received signal. In some embodiments, the method can also include determining if the received signal, for example, the MAC OUI and serial number in the received signal, is recognized.

According to some embodiments, the method can include prompting a user to modify the least one feature of the wireless mobile device in accordance with the received signal, for example, the MAC OUI and serial number in the received signal, before modifying the at least one feature of the wireless mobile device in accordance with the received signal, for example, the MAC OUI and serial number in the received signal. Prompting the user can include notifying the user of a surrounding environment and notifying a user of restrictions in the surrounding environment.

In some embodiments, the method can include storing a state of the features of the wireless mobile device before modifying the at least one feature of the wireless mobile device in accordance with the received signal, for example, the MAC OUI and serial number in the received signal. The method can also include periodically receiving the signal, for example, the signal with the MAC OUI and serial number, determining when the received signal, for example, the received signal with the MAC OUI and serial number, is not received within a predetermined period of time, and when the signal, for example, the signal with the MAC OUI and serial number, is not received within the predetermined period of time, re-modifying the at least one feature of the wireless mobile device. Re-modifying the at least one feature of the wireless mobile device can include reverting the at least one feature to the stored state of the at least one feature.

The method in accordance with some embodiments can include prompting a user to re-modify the at least one feature of the wireless mobile device, and prompting the user can include notifying the user of a surrounding environment and notifying the user of a lack of restrictions in the surrounding environment.

In some embodiments, modifying the at least one feature of the wireless mobile device in accordance with the received signal, for example, the MAC OUI and serial number in the received signal, can include enabling the at least one feature or disabling the at least one feature. Modifying the least one feature of the wireless mobile device in accordance with the received signal, for example, the MAC OUI and serial number in the received signal, can also include providing at least one of advertising materials, coupons, marketing materials, and surveys to a user of the wireless mobile device.

In some embodiments, the MAC OUI and/or the serial number can include a twelve-digit hexadecimal number. In some embodiments, receiving the signal can include receiving a GPS location of the wireless mobile device or receiving triangulation data from a plurality of cellular towers in range. In some embodiments, the method can include overriding the modification of the at least one feature of the wireless mobile device or prohibiting overriding in the absence of an emergency situation.

According to another embodiment, a method of controlling features of a wireless mobile device is provided. This method can include determining a transmission mode, determining one or more signals, for example, one or more MAC OUIs and serial numbers carried in the signals, corresponding to the transmission mode, and transmitting the one or more signals, for example, signals with the one or more MAC OUIs and serial numbers, carried therein. Transmitting the signal can include transmitting a Bluetooth signal, a WiFi signal, or transmitting a signal with a unique MAC OUI and serial number carried therein.

In some embodiments, determining the transmission mode can include determining a surrounding environment. Determining the transmission mode can also include determining a device class and/or controlling transmission of the signal according to parameters of the surrounding environment or determining a transmission radius based on the surrounding environment. The device class can be the type or class of transmission device.

In accordance with another embodiment, a transmission device is provided. The transmission device can include a transmitter, executable control software stored on a non-transitory computer readable storage medium, and at least one programmable processor for determining a transmission mode of the transmitter, determining one or more signals, for example, one or more MAC OUIs and serial numbers carried in the signals, corresponding to the transmission mode, and providing a signal to the transmitter for transmission. For example, the signal provided to the transmitter can include the one or more MAC OUIs and serial numbers. The transmitter can transmit a Bluetooth signal or a signal with a MAC address carried therein.

In some embodiments, the transmission device can include a user-operable input device for selecting the transmission mode of the transmitter. The transmission device can also include a power supply and a database for storing the signals, for example, the one or more MAC OUIs and serial numbers carried in the signals. In some embodiments, the programmable processor can retrieve the one more signals, for example, the MAC OUIs and serial numbers carried in the signals, from the database based on the transmission mode of the transmitter.

Each of the one or more signals, for example, the one or more MAC OUIs and serial numbers carried in the signals, can correspond to controlling a predetermined feature of a remote wireless mobile device. Further, the transmission mode or device class of the transmitter can correspond to a transmission radius of the transmitter.

According to another embodiment, a method of controlling a wireless mobile device is provided. The method can include receiving, at the wireless mobile device, an unsolicited signal from a short range wireless transmitter, determining, based at least in part on the signal, if commercial information should be presented to a user of the wireless mobile device; and causing the commercial information to be presented to the user. The short range wireless transmitter can be selected from a group consisting of a Bluetooth transmitter and a WiFi transmitter, the commercial information can include one of advertising materials, coupons, marketing materials, incentives, and surveys, and causing the commercial information to be presented to the user can include prompting the user to take action.

In some embodiments, the method can include periodically receiving the signal, determining when the signal is not received within a predetermined period of time, and when the signal is not received within the predetermined period of time, providing additional information to the user of the wireless mobile device. Providing the additional information to the user can include emailing the additional information to the user.

DESCRIPTION OF THE PREFERRED EMBODIMENTS

While this invention is susceptible of an embodiment in different forms, the drawings and description herein show and describe in detail specific embodiments thereof with the understanding that the present disclosure is to be considered as an exemplification of the principles of the invention. The drawings and description herein are not intended to limit the invention to the specific illustrated embodiments.

Embodiments described herein include systems and methods for remotely controlling features of wireless mobile devices. Preferably such systems and methods remotely transmit signals to wireless mobile devices to enable or disable certain features of the devices.

A control apparatus used in this combination may include a transmission device for transmitting signals. In some embodiments, the transmission device can be owned, operated, and employed by a facility owner or operator, for example, a school teacher, airline crew, store operator, theater operator, restaurant owner, construction site manager, traffic operator, or others who wish or need to control the operation of wireless mobile devices within a particular facility or region.

The transmission device can be portable or not portable. For example, the transmission device can be permanently fixed in an automobile or airplane or permanently fixed to a traffic light. Alternatively, the transmission device can be plugged into an outlet in a classroom or movie theater or temporarily installed at a construction site.

In accordance with some embodiments, transmission devices may utilize Bluetooth, Global Positioning, and/or Geo-location tracking technology to control certain features of a wireless mobile device in a defined area without inhibiting the complete functionality of the device. It is to be understood that this listing of technologies is not intended to be exhaustive.

The ability to control features of a device can depend on the location of the device so that features of the device are enabled or disabled in accordance with the surrounding environment. For example, a transmission device can act as a beacon and transmit a signal. The signal transmitted by the transmission device can be a digital signal and can include a Media Access Control (MAC) Organizationally Unique Identifier (OUI) and serial number therein, and/or can include a universally unique identifier (UUID) therein. It is to be understood that in some embodiments, the signal transmitted by the transmission device is a notification signal and need communicate substantive data outside of the notification/beacon.

In some embodiments the MAC OUI, the serial number, and/or the UUID can include a twelve-digit hexadecimal number, which can be comprised of two parts. For example, the first 6 digits can include the OUI or a company identifier, and the last 6 digits can include a serial number. Each OUI can have approximately 16 million serial numbers, and in some embodiments, the recognized unique OUI and unique serial number(s) can determine which function(s) of a device to modify. Enabling or disabling different functions can correspond to different and unique twelve-digit hexadecimal numbers.

The MAC OUI, serial number, and/or UUID carried in the signal transmitted by the transmission device can vary according to the specific environment in which the transmission device is located and according to the specific features the transmission device intends to control. For example, a MAC OUI, serial number, and/or UUID carried in a signal can be unique to a specific environment or facility and can be unique to the control of a specific wireless mobile device feature.

Wireless mobile devices in range of the transmission device can receive the signal from the transmission device. Then, the wireless mobile devices can detect the MAC OUI, serial number, and/or UUID carried in the received signal and enable or disable certain features of the mobile device. The device features that are enabled or disabled can be determined by the MAC OUI, serial number, and/or UUID carried in the signal received from the transmission device.

In some embodiments, when a wireless mobile device detects a signal from a transmission device, the mobile device can prompt a user to manually enable or disable certain features of the mobile device. When the user does not comply with the prompt, for example, within a predetermined period of time or after a predetermined number of prompts, the mobile device can automatically enable or disable the appropriate feature(s).

Figure 1:
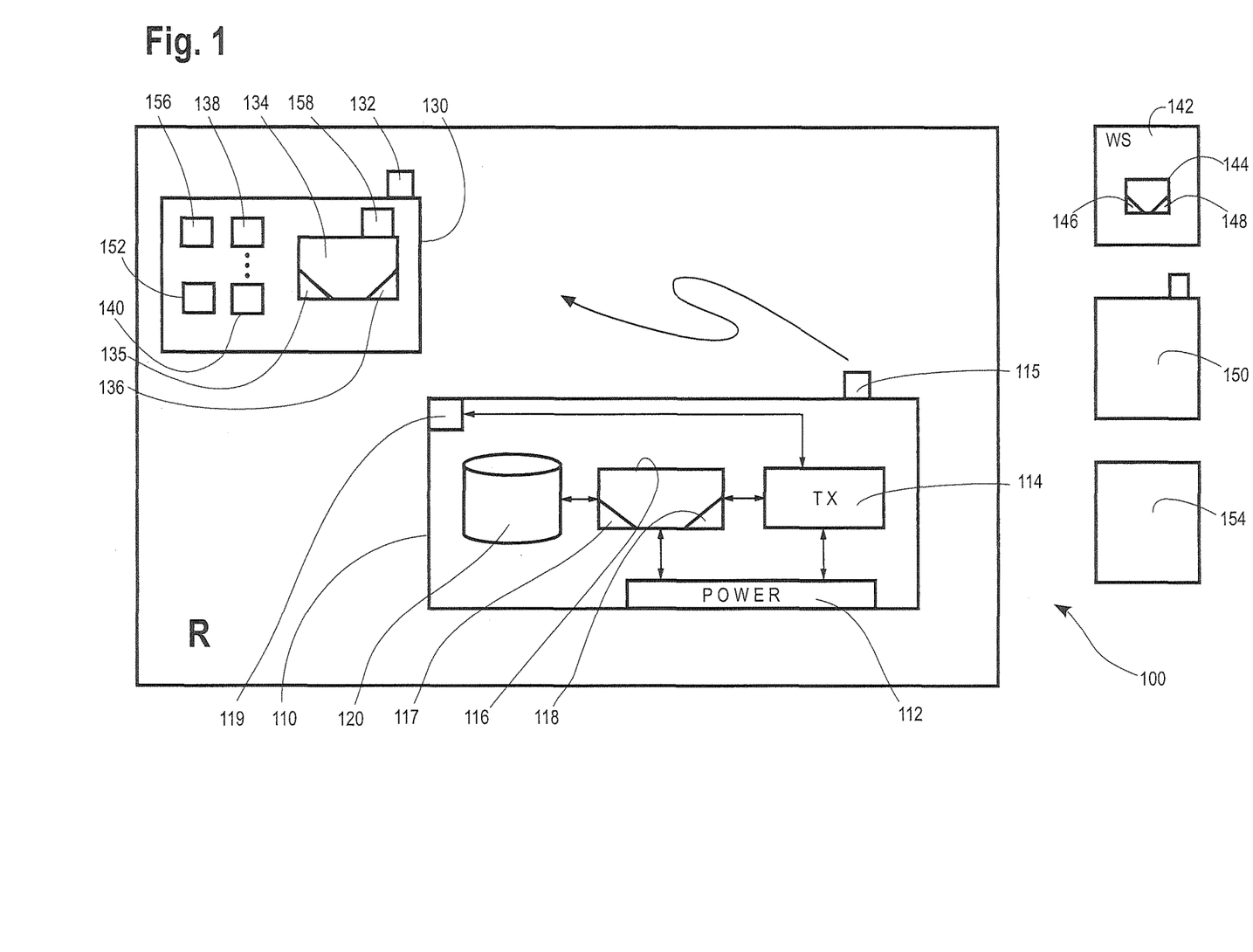
FIG. 1 is a block diagram of a system in accordance with the present invention.

FIG. 1 shows a block diagram of a system 100. As seen in FIG. 1, the system 100 can include a control apparatus, for example, a transmission device 110 and a wireless mobile device 130 in a region R.

The transmission device 110 can include a power source 112, for example a DC power source between 2 and 12 volts. A dry cell is one such power source. In some embodiments, the device 110 can plug into an external outlet or power receptacle that supplies power to the device 110. For example, the external outlet can be a 120 volt AC outlet. In either embodiment, power from the power source 112 or the external power supply can provide power to a transmitter 114 and control circuitry 116 in the device 110. The transmitter 114 can communicate with the control circuitry 116, and the control circuitry 116 can access a database 120. In some embodiments, the transmitter 114 and/or the control circuitry 116 can be implemented with a printed circuit board.

In some embodiments, the control circuitry 116 can include one or more programmable processors 117 and executable control software 118 as would be understood by those of skill in the art. The executable control software 118 can be stored on a transitory or non-transitory local computer readable medium.

The database 120 can store one or a plurality of addresses, MAC (Ms, serial numbers, and/or UUIDs. For example, the database 120 can store one or a plurality of different Media Access Control (MAC) addresses. In some embodiments, each MAC address can correlate to the control of a different feature of a wireless mobile device. In other embodiments, a single MAC address can correlate to the control of a plurality of features of a wireless mobile device. The database may be stored in any convenient portable storage medium, including, without limitation, RAM, ROM, flash memory, and the like.

Various features of a wireless mobile device can be controlled in accordance with systems and methods described herein. For example, a MAC OUI, serial number, and/or UUID carried in a signal received by a wireless mobile device can correspond to the control of the following features: texting, audible ring tones and alerts, silent or vibrate mode, handset speaker, voice dialing, Bluetooth connectivity, keypad, brightly backlit screen, dimly backlit screen, wireless transmission capabilities, and non-essential preinstalled or third party applications, for example, instant messaging applications, social networking applications, game, internet surfing applications, and the like. It is to be understood that this list is exemplary only. Any and all features of a wireless mobile device can be controlled and modified in accordance with the present systems and methods.

The transmitter 114 can act as a beacon. When receiving power, the transmitter 114 can transmit a signal, for example, a Bluetooth signal, with one or a plurality of addresses, MAC OUIs, serial numbers, and/or UUIDs carried therein. The transmitter 114 can transmit signals via, for example, an antenna 115 of the device 110. For example, the control circuitry 116 can access the database 120 to retrieve a MAC OUI, serial number, and/or UUID, and the control circuitry 116 can communicate the retrieved MAC OUI, serial number, and/or UUID to the transmitter 114, which can broadcast a signal with the MAC OUI, serial number, and/or UUID carried therein via an antenna 115.

In some embodiments, the transmission device 110 can be controlled by environmental parameters of the environment in which the device 110 is located. For example, the transmission device 110 can be programmed so that when the transmission device 110 is located in an automobile, the transmitter 114 transmits signals only when the speed of the automobile has reached a predetermined threshold. In these embodiments, the transmission device 110 can determine the speed of the automobile by, for example, communicating with the automobile's speedometer.

In some embodiments, the transmitter 114 can function in one of a plurality of different modes corresponding to transmission distances. For example, the transmitter 114 can function in a first mode that corresponds to transmitting signals in an approximately 100 meter radius. The transmitter 114 can also function in a second mode that corresponds to transmitting signals in an approximately 10 meter radius, and in a third mode that corresponds to transmitting signals in an approximately 1 meter radius. In the various embodiments, the transmitting device 110 can include a switch or other user-operable device 119 to select the mode of the transmitter 114. As seen in FIG. 1, the switch 119 can communicate with the transmitter 114.

The mode of the transmitter 114 can vary according to the environment in which the transmission device 110 is located, including features of the environment in which the device 110 is located such as the environment's layout, location, and size. For example, if the device 110 is placed in an automobile, the transmitter 114 can be set to a third mode in which the transmitter 114 transmits signals in an approximately 1 meter radius. Thus, when in the third mode, the range of transmission from the transmitter 114 can be limited to the driver of the automobile. Passengers in the automobile need not receive signals from the transmitter 114 and need not restrict any features of their mobile devices.

Similarly, if the device 110 is placed in an airplane, classroom, or movie theater, the transmitter 114 can be set to a first mode in which the transmitter 114 transmits signals in an approximately 100 meter radius. Thus, when in the first mode, the range of transmission of the transmitter 114 can ensure that all occupants of the airplane, classroom, or theater receive signals from the transmitter 114 so that features of each of their mobile devices can be restricted in accordance with the particular environment.

In some embodiments, the mode of the transmitter 114 can determine which and/or how many MAC OUIs, serial numbers, and/or UUIDs are carried in the signal transmitted by the transmitter 114. Furthermore, which and/or how many MAC OUIs, serial numbers, and UUIDs are carried in the signal transmitted by the transmitter 114 can determine which features of a wireless mobile device are controlled.

For example, when the transmitter 114 is set to a third mode based on its location in an automobile, the transmitter 114 can transmit signals with first and second MAC OUIs, serial numbers, and/or UUIDs carried therein. The first MAC OUI, serial number, and/or UUID can correspond to disabling non-hands free features of a wireless mobile device, and the second MAC OUI, serial number, and/or UUID can correspond to enabling hands free features of the wireless mobile device. Alternatively, the transmitter 114 can transmit signals with a third MAC OUI, serial number, and/or UUID carried therein. The third MAC OUI, serial number, and/or UUID can correspond to both disabling non-hands free features and enabling hands free features of the wireless mobile device.

When the transmitter 114 is set to a first mode based on its location in an airplane, classroom, or movie theater, the transmitter 114 can transmit signals with fourth and fifth MAC OSIs, serial numbers, and/or UUIDs carried therein. For example, the fourth MAC OUI, serial number, and/or UUID can correspond to disabling RF transmissions or audible tones of a wireless mobile device, and the fifth MAC OUI, serial number, and/or UUID can correspond to enabling an airplane, silent, or vibratory mode of a wireless mobile device. Alternatively, the transmitter 114 can transmit signals with a sixth MAC OUI, serial number, and/or UUID carried therein. The sixth MAC OUI, serial number, and/or UUID can correspond to both enabling and disabling: disabling RF transmissions or audible tones and enabling an airplane, silent, or vibratory mode of a wireless mobile device. In the various embodiments, the control circuitry 116 can assess the mode of the transmitter 114, retrieve a corresponding MAC OUI, serial number, and/or UUID from the database 120, and provide that MAC OUI, serial number, and/or or UUID to the transmitter 114 for carrying in a signal.

Although a few examples have been given, it is to be understood that the transmitter 114 can transmit signals with any number of MAC OUIs, serial numbers, and/or UUIDs carried therein. For example, the transmitter can transmit signals with one or a plurality of different MAC OUIs, serial numbers, and/or UUIDs carried therein. Each MAC OUI, serial number, and/or UUID can correspond to the control of a different wireless mobile device feature.

As explained above, the transmission device 110 can send signals to a wireless mobile device 130 in the region R. The region R can correspond to the radius of transmission of the transmission device 110. The mobile device 130 in the region R can receive signals from the transmission device 110 and control features of the device 130 accordingly.

However, a mobile device 150 outside of the region R is out of the transmission range of the transmission device 110. Accordingly, the mobile device 150 does not receive signals from the device 110, and features of the mobile device 150 will not be controlled in accordance with signals from the device 110.

It is to be understood that more than one wireless mobile device can be in the region R and can receive signals from the transmission device 110. For example, any number of mobile devices can be in the region R, receive signals from the transmission device 110, and control features of the mobile device accordingly. In this manner, facility owners or operators can control the features of multiple wireless mobile devices. Preferably, the receipt of signals from the transmission device 110 and the control of a mobile device in the region R are independent of any other mobile device in the region R.

The wireless mobile device 130 can include components of known mobile devices as would be understood by those of ordinary skill in the art. In addition, the device 130 can include an antenna 132 that detects signals from the transmission device 110. The antenna 132 can then provide the detected signal to control circuitry 134 in the device 130.

In some embodiments, the control circuitry 134 can include one or more programmable processors 135 and executable control software 136 as would be understood by those of skill in the art. The executable control software 136 can be stored on a transitory or non-transitory local computer readable medium.

The control circuitry 134 and programmable processors 135 can illustratively execute the control software 136 on a continuous loop in the background of a normal operating platform of the wireless mobile device 130. Accordingly, once the control software is installed on a device 136, user action is not required for the device 130 to detect and recognize MAC OUIs, serial numbers, and/or UUIDs in signals received from a transmitting device 110 and to modify features of the device 130 accordingly. For example, the control software 136 can enable the antenna 132 of the device 130 to search for a signal from a transmitting device, for example, the device 110. The control software 136 can also be programmed to detect and recognize predetermined addresses or MAC ° Ws, serial numbers, and/or UUIDs carried in received signals.

In some embodiments, the control software 136 can be installed on a wireless mobile device by the manufacturer of the device. In other embodiments, the control software 136 can be downloaded onto a wireless mobile device by a user of the device. For example, the control software 136 can be embodied in a downloadable application.

The control software 136 can enable the antenna 132 of the device 130 to receive signals from the transmitting device 110. In some embodiments, the control software 136 can prevent the antenna 132 from transmitting signals to the transmitting device 110 so as to prevent the device 130 from connecting or pairing with the transmitting device 110.

As is known in many technologies, such as Bluetooth, two devices need to be paired to communicate with each other. Pairing is often desired to protect private data that is being transmitted or to limit which devices can be controlled. However, in the present systems and methods, the transmitting device 110 need not pair with a wireless mobile device 130 for the device 130 to receive signals from the transmitting device 110. By not pairing with the transmitting device 110, the wireless mobile device 130 can conserve power in the power supply 112, can prevent the time consuming operation of saving information about the transmitting device 110 in memory, and can prevent security breaches. For example, when the device 130 is not paired with the transmitting device 110, there is no opportunity for a hacker to access sensitive information stored on the device 130.

In some embodiments, the control software 136 can be executed at a predetermined time interval. This can also conserve power in the power supply 112.

Illustratively, the control software 136 can be updated at any time. For example, the wireless mobile device 130 can receive downloads or updates to the software 136 via a cellular network.

It is to be understood that all wireless mobile devices in range of the transmitting device 110 can receive signals from the device 110. However, not all wireless mobile devices in range of the transmitting device 110 can detect and recognize MAC Mils, serial numbers, and/or UUIDs carried in signals from the transmitting device 110. Accordingly, not all wireless mobile devices within range of the transmitting device 110 can control its features in accordance with the present systems and methods. For example, wireless mobile devices should include the control software 136 to detect and recognize MAC OUIs, serial numbers, and/or UUIDs carried in signals received from the transmitting device 110. If a wireless mobile device is in range of the transmitting device 110 but does not include the control software 136, then the wireless mobile device will not be affected by any signal received from the device 110.

Figure 2:
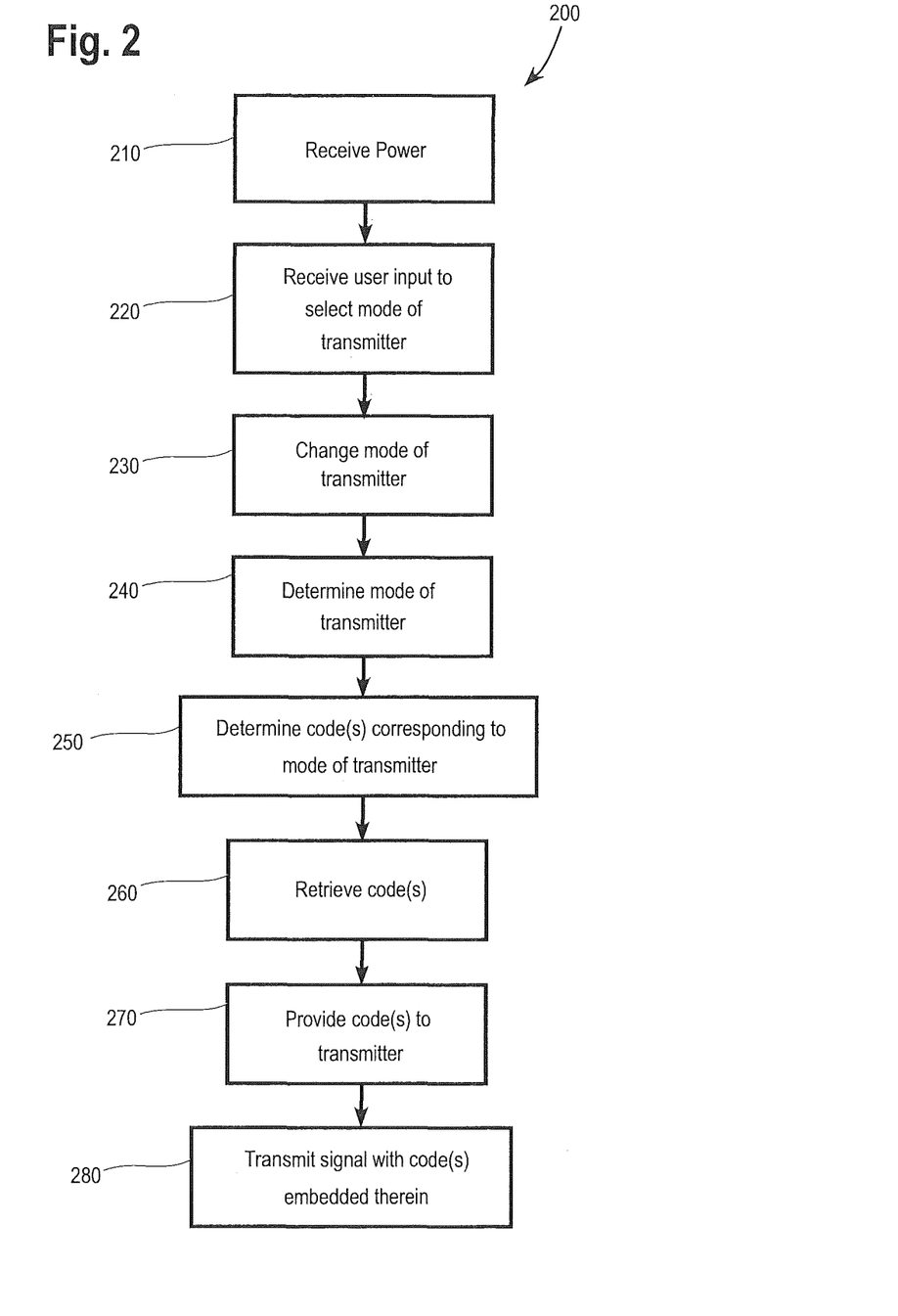
FIG. 2 is a flow chart of a method of transmitting a signal in accordance with the present invention.

FIG. 2 is a flow chart of a method 200 of transmitting a signal in accordance with the present invention. A transmitting device, for example 110, including its transmitter 114, control circuitry 116, programmable processor 117, and control software 118 can execute the method 200 and others described herein.

As is seen in FIG. 2, the method 200 can receive power, as in 210. In some embodiments, power can be received from a power source, for example, 112. Optionally, the method 200 can receive user input that selects the mode of a transmitter, for example, 114, as in 220, and then change the mode of the transmitter accordingly, as in 230.

Whether or not the method 200 changes the mode of the transmitter, the method 200 can determine the mode of the transmitter, as in 240, and then determine a MAC OUI, serial number, and/or UUID or a plurality of MAC OUIs, serial numbers, and/or UUIDs corresponding to the mode of the transmitter, as in 250.

After the appropriate MAC OUIs, serial numbers, and/or UUIDs corresponding to the mode of the transmitter are determined, the method 200 can retrieve those MAC OUIs, serial numbers, and/or UUIDs, as in 260. For example, the method 200 can retrieve the MAC OUIs, serial numbers, and/or UUIDs from a database, for example, 120. The retrieved MAC OUIs, serial numbers, and/or UUIDs can be provided to the transmitter, as in 270, and then a signal with the MAC OUIs, serial numbers, and/or UUIDs carried therein can be transmitted as in 280.

Figure 3:
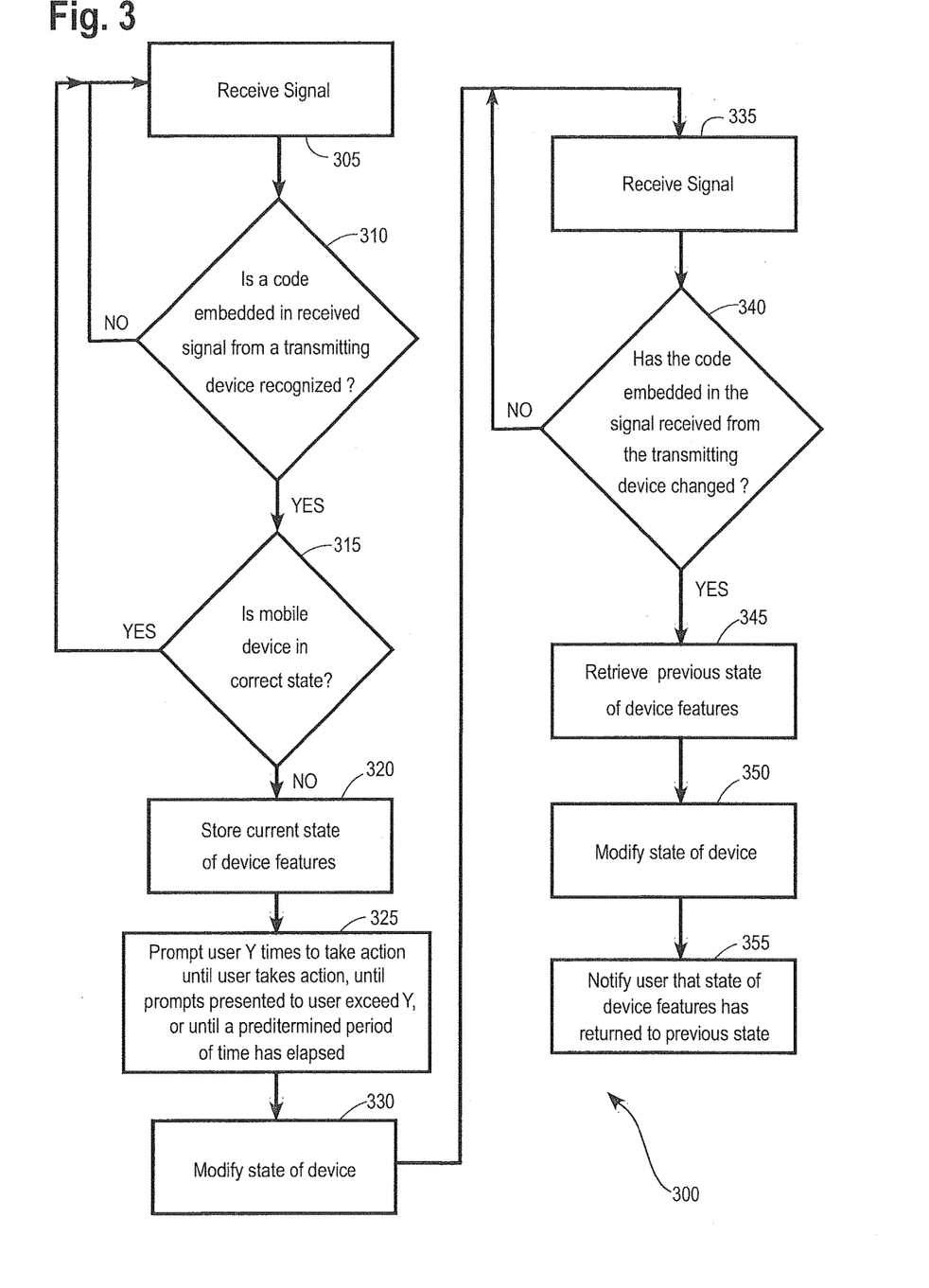
FIG. 3 is a flow chart of a method of receiving a signal and modifying features of a wireless mobile device in accordance with the present invention.

FIG. 3 is a flow chart of a method 300 of receiving a signal and modifying features of a wireless mobile device. A wireless mobile device, for example, 130, including its associated control circuitry 134, programmable processor 135, and control software 136 can execute the method 300 and others described herein.

As seen in FIG. 3, the method 300 can receive a signal from the transmitting device 110, as in 305. In some embodiments, the method 300 can search for a signal from the transmitting device 110 in predetermined time intervals. For example, the method 300 can search for a signal from the transmitting device 110 every X number of seconds.

When a signal is received from the transmitting device 110, the method 300 can determine if a MAC OUI, serial number, UUID, and/or address is detected and recognized in the received signal, as in 310. If not, then the method 300 can continue receiving signals, as in 305.

However, if a MAC OUI, serial number, UUID, and/or address is detected and recognized in a received signal, as in 310, then the method 300 can determine if the wireless mobile device is in the correct state, as in 315. For example, the MAC OUI, serial number, and/or UUID can correspond to specific features of the wireless mobile device that should be enabled or disabled. The method 300 can determine if those specific features are in the correct state for the MAC OUI, serial number, and/or UUID detected.

If yes, then nothing further need be done, and the method 300 can continue receiving signals, as in 305. However, if the wireless mobile device is not in the correct state, then the method 300 can store the current state of device features, as in 320. The stored current state can be used later in the method 300 to revert to that state.

After the current state of device features are stored as in 320, the method 300 can prompt a user to take action, as in 325. For example, the method 300 can notify the user of the environment that he or she has entered. In some embodiments, the environment can be determined from the MAC OUI, serial number, and/or UUID carried in the signal received from the transmitting device 110, and the method 300 can prompt the user to comply with restrictions of that environment. For example, the method 300 can prompt the user to enable or disable certain features of his or her wireless mobile device. The method can prompt the user a predetermined number of times, for example, Y times.

If the user does not take appropriate action after the predetermined number of prompts and/or if the user does not take appropriate action within a predetermined period of time, then the method 300 can proceed to automatically modify the state of wireless mobile device, as in 330. For example, the method 300 can enable or disable certain features of the wireless mobile device in accordance with the MAC OUI, serial number, and/or UUID recognized in the received signal.

A reversion to a previous state may be desired. Accordingly, after the wireless mobile device has been modified as in 330, the method 300 can again receive signals from the transmitting device 110, as in 335. In various embodiments, the method 300 can search for a signal from the transmitting device 110 in predetermined time intervals. For example, the method 300 can search for a signal from the transmitting device 110 every X number of seconds.

When a signal is received from the transmitting device 110, as in 335, the method 300, as in 340, can determine if a MAC OUI, serial number, and/or UUID carried in the received signal has changed from the MAC OUI, serial number, and/or UUID that was recognized as in 310. If not, then no features need be modified and the method 300 can continue receiving signals, as in 335.

However, when the MAC OUI, serial number, and/or UUID carried in a signal received as in 335 has changed from the MAC OUI, serial number, and/or UUID that was earlier recognized as in 310, the method 300 can retrieve the previous state of device features as in 345 that were stored as in 320. Then, the method 300 can modify the wireless mobile device as in 350. For example, the method 300 can enable or disable certain features of the wireless mobile device so that the features are in the same state as they were before the method 300 changed those features. Finally, the method 300 can notify the user that the state of the wireless mobile device has returned or reverted to its previous state as in 355.

In some embodiments, the method 300 can notify the user that he or she is leaving a particular environment. For example, the method 300 can determine that a user is leaving the range of a transmitting device 110 when a signal is not received from the transmitting device within a predetermined period of time or when the MAC OUI and serial number recognized in a received signal has changed. In these embodiments, the method 300 can prompt the user to restore features of his or her mobile device to a previous state, that is, the state of the device before the user entered the particular environment. If the user does not comply within a predetermined period of time or after a predetermined number of prompts, then the method 300 can automatically modify the wireless mobile device as in 350.

The systems and methods explained above incorporate a transmission device 110 transmitting a signal, for example, a Bluetooth signal that can be detected by a wireless mobile device 130. However, the present systems and methods can also use GPS or Geo-location tracking technology.

For example, a wireless mobile device 130 can be equipped with a GPS system to determine the location of the device 130. Depending on the location of the device 130, the present systems and methods can determine the environment in which the device 130 is located and control features of the device 130 accordingly.

Similarly, a wireless mobile device 130 can receive signals from a plurality of different cellular towers in range. Then, the present systems and methods can use triangulation methods to determine the location of the device 130. Depending on the location of the device 130, the present systems and methods can determine the environment in which the device 130 is located and control features of the device 130 accordingly.

In addition to controlling features of a wireless mobile device, the present systems and methods can also provide information to a user of a wireless mobile device according to the device location. For example, when the present systems and methods determine that a user of a device has entered a particular store, the systems and methods can present advertising materials, coupons, or marketing materials to the user via his or her device. Similarly, when the present systems and methods determine that a user of a device has exited a particular store, the systems and methods can present to the user, via his or her device, surveys or incentives for returning to the store. If the user's device is linked to an email account, the present systems and methods can also send any of these advertising materials, coupons, marketing materials, surveys, or incentives to the user's email address.

Advantageously, when any features of a wireless mobile device are enabled or disabled, the present systems and methods can provide a user with the ability to override the changes to device features. For example, when the described system or method changes a feature of a wireless mobile device, the user can undo the change even before leaving a particular environment.

Similarly, the described systems and methods can provide a user of a device with the ability to make emergency telephone calls at all times. For example, even when the ability to make calls is disabled by the described systems and methods, the device can still call "911."

It is to be understood that the described systems and methods can be used in a plurality of different applications, without limitation. For example, the wireless portable device may include a number of separate computer programs 138, 140 that each modify operation of the mobile device in real time in a separate manner. These programs may operate by themselves or in conjunction with one or more program features provided through a website 142 as described in more detail below.

When used in conjunction with the website, the website may include control circuitry 144 supports the individual features of the programs. In this regard, the control circuitry may include one or more processor apparatus 146 executing one or more computer programs 148 that each correspond to one of the programs of the portable device.

In general and whether used with the external website or not, each of the programs of the portable device has a unique identifier that corresponds to a sequence of identification bits of the beacon. The identifier of any given program may correspond to one or more bits from an organization identifier or one or more bits of a serial number of the beacon.

In addition, at least some of the programs may have a distance requirement for operation of the program. In this case, execution of the program may depend upon the distance of the portable device from the beacon.

For example, one of the programs may be an operator's anti-distraction program that corresponds to operation of a motor vehicle. The anti-distraction program may disable incoming voice calls, instant messages and e-mail to the portable device under certain conditions.

For example, the transmitter of the beacon may be located in the motor vehicle adjacent the driver's seat. Once activated, a program executing the anti-distraction program may measure a signal strength of the beacon via a signal strength meter 156. The processor may delay execution of the anti-distraction program until the portable device (user) is within some predetermined distance (e.g., less than 3 feet) from the beacon.

The identifier of the anti-distraction program may correspond to an organizationally unique identifier of a manufacturer of motor vehicles. The identifier may be structured to a particular type of manufacturer (i.e., vehicle) or to vehicles in general. This may be accomplished by only choosing certain digits from the organizational identifier. The identifier may also be structured to correspond to a particular vehicle by also including the unique identifier of a particular vehicle in the identifier of the anti-distraction program.

In use, a program processor may detect beacons and retrieve a sequence of bits from the beacon. The sequence may be compared with the identifiers of each of the programs of the portable device for a correlation. In this case correlation may be accomplished by matching the one or more bits of the identifier sequence of the program with a content and location of one or bits of the identifier from the beacon.

Once a match has been established between the anti-distraction program and the beacon, a signal processor may compare the measured signal strength of the beacon. If the signal is below a minimum signal threshold level, then the signal processor may delay operation of the anti-distraction program until the driver sits down in the driver's seat.

The concept of using distance for modifying the real time operation of the portable device may be extended to any of a number of different applications and levels. For example, a distance of 3 feet may be used with a bus driver to prevent distraction of the bus driver and in order to reduce traffic accidents. On the other hand, a distance of 6 feet may be used to disable the cell phones of passengers near the bus driver in order to further reduce distractions.

In some embodiments, the described systems and methods can be used in connection with restaurant and/or store visits and/or service appointments. Upon arrival at a restaurant, store, and/or service location, a beacon transmission device in the region (e.g., located at the entrance) can transmit a signal to a user's wireless mobile device and, upon receipt, the user and/or the user's wireless mobile device can take action in accordance with the signal. For example, the signal transmitted from the transmission device can provide a notification to the user and/or to the user's wireless mobile device to execute some sort of action, including but not limited to, connecting to a website.

In this case, the beacon may include an identifier identifying the beacon as from a particular restaurant. Upon decoding the beacon and matching the beacon identifier to a restaurant program, a processor executing the restaurant program may access a website of the restaurant. In this case, the Internet address of the website may be obtained from the unique beacon identifier.

Upon accessing the website of the restaurant, the website may response in a number of different ways. For example, a processor of the website may download a reservation or appointment request (form) and display the form on the display of the portable device. The user may fill out the form and activate a submit button on the form. The form may be sent back to the website where a processor may enter the name of the user in a reservation list of people awaiting tables in the restaurant. The processor may also download an acceptance notice that notifies the user of the expected wait time. When a table is ready, the website may forward a notice to the user that his/her table is ready.

A similar process may be used at car washes, oil change location, etc. In all cases, the user is given an appointment and notified when an opening is available for service.

Upon completing the dining experience, another beacon may be placed near a cash register of the restaurant (or point of sale (POS) location of some other business). In this case, the beacon activates a cash transfer program within the portable device. In this case, the cash transfer program identifies the recipient of the cash transfer from the content of the beacon. If the user has the check for the meal in his hand, he/she may enter the total amount and authorize transfer of full payment to the bank account of the restaurant (or other business).

Upon transfer of the payment, a budget tracking program may be activated that tracks cash transfers of the user. The budget tracking program may record a location and dollar amount of each expenditure as well as a total for some time period (e.g., week, month, etc.).

As the user exits the restaurant, the user may pass another beacon that requests feedback from the user. In this case, the beacon triggers a survey program within the portable device. The survey program goes to the website of the restaurant and downloads a survey form. The user completes the form and returns it to the restaurant.

In another embodiment, a friends-in-the-area program notifies a user of other people (friends) in the same area in which he/she is located. This may be accomplished via beacons placed in public areas that cause the portable device to report their location via a social networking site. Upon receiving notice via Facebook of another person (friend) in the same location, the program provides the user with notice of the presence of the friend and an identity of the friend.

Alternatively, or in addition, the portable device may include a global positioning (GPS) device. In this case, receipt of the beacon causes the program to report their location to their Facebook page. If the program receives notice of other friends in the same area, the program notifies the user.

In another embodiment, a beacon may be placed at a place of work or at a school. As the user enters the school or place of work, the beacon activates a reporting program of the portable device. In this case the reporting program reports a time of arrival of the person at work or school and a time of departure to a sever 154. This eliminates the problem of keeping track of hours of work or attendance at school.

In another embodiment, one or more beacons may be placed at a front door of a home with one or more prerecorded messages saved in a memory of the portable device. In this case, as a child passes the beacon, the beacon activates a messaging program that sends the prerecorded message to a parent or other adult notifying the parent that their child has returned home.

Under another embodiment, one or more beacons are placed in/on vehicles of mass transportation (e.g., buses, trains, etc.). In this case, the beacon may activate a scheduling program that accesses a website of the transportation provider. In this case, the beacon may identify the bus or train that the user is riding. In response, the website may download a list of future stops and an estimated time until the next stop to the portable device for the benefit of the user.

Under another embodiment, a beacon at a cash station (e.g., ATM) may activate a security program within the portable device. In this case, the security program may retrieve a location from the beacon or from a local GPS device within the portable device and report the transaction to the user's bank. This may be useful where a user has recorded the locations where cash station use is allowed and may be used by the bank as in indicator that the user's debit card has been stolen and the location where it is being used.

Under still another embodiment, a beacon may be provided along a roadside to alert a driver to construction. In this case, the beacon can be attached to construction barriers. Upon receiving the beacon, the portable device may block incoming calls and messages. The portable device may also provide an audible alert to the driver of the possibility of a reduced speed limit in order to avoid traffic tickets.

In another embodiment, a respective beacon 158 may be located within one or more or each of the mobile devices 130, 150. In this regard, the beacons 158 may be substantially identical to the beacon 110 except that they are each carried by a respective mobile device. In this context, the corresponding region R is mobile and surrounds the instantaneous geographic location of each respective mobile device.

Inclusion of a beacon within one or more of the mobile devices allows for the automatic documentation and verification of certain human interactions (e.g., between a human user and a human service provider).

Under one illustrated embodiment, this concept may be used in the context of Uber/Lyft, or other autonomous ridesharing services. In this case, the Bluetooth or WiFi advertising data (i.e. MAC address, UUID, Major, Minor or other unique signal) of a passenger's phone may be used as a beacon by a ride service to detect a passenger when the driver gets close to the location of a scheduled passenger or the passenger enters the driver's car. In this case, a passenger identifier shows up on the driver's phone app or autonomous vehicle tracking device and operates as an indicator to start the trip. When the passenger disembarks the vehicle, the driver's app or autonomous vehicle device no longer receives the passenger's beacon signal and conveniently (automatically) stops the trip, so the driver does not have to end the trip manually. This feature eliminates possible fraud or excess charges due to the absent mindedness of the driver where the driver continues the trip (and billing for the trip) without the passenger (i.e., after the passenger has left the car).

At the end of a trip, an Uber, Lyft, taxi or autonomous vehicle reference identifier and way for the passenger to pay may be presented or otherwise show up on the user's phone via a beacon (Bluetooth or WiFi) and app of the driver/vehicle and may link to third party payment systems directly instead of requiring a passenger to swipe a credit card before leaving the vehicle. This reduces the amount of time that is required to make a payment using third party providers such as an electronic fund transfer service (i.e. Venmo, Paypal, Chase Quick Pay, Apple pay or other similar service).

Under this embodiment, the human passenger may use an application of a conventional ride hailing service (e.g., Uber, Lyft, autonomous vehicle, etc.) to request transportation from the geographic point of origin to some particular destination through a server of some ride providing service (e.g., local taxi service, Uber, Lyft, autonomous vehicle, etc.). The ride request may include some particular request identifier (e.g., MAC address, UUID, Major, Minor or other unique signal). As the passenger enters the vehicle, the beacon from the passenger's mobile device announces its presence to the driver's mobile device or a fixed tracking system (driver's mobile device) located within the vehicle (driver's mobile device). A processor within the driver's mobile device may detect the beacon and correlate the passenger identifier with a ride request received from the ride website. The website may also correlate the identifier with previous ride requests from the same user and with previous payment methods used by the user. A tracking processor within the passenger's mobile device and/or the driver's mobile device may detect entry of the passenger and a geographic location of passenger entry as a point of origin for the ride. The processor may continue to detect the passenger's presence in order to track a route of the ride and a destination where the passenger was dropped off.

At the ride destination, the passenger's mobile device may be queried for a payment reference (e.g., credit card, account number, etc.). This may occur at the destination via the driver triggering a payment request button on his/her mobile device. Alternatively, if the presence of the passenger within the vehicle were based upon some predetermined distance (e.g., 5 feet from the driver), then termination or arrival at the destination may be detected when the passenger exceeds that distance. In either case, activation of the payment request button by the driver or the automatic detection of arrival at the ride destination (or the detection of the passenger's exit from the vehicle) may cause the driver's mobile device to send a payment request to the rider's mobile device. The payment request may be presented on a display of the passenger's mobile device for approval. The passenger may approve the payment or ignore the request. If the passenger ignores the request, then payment may be made by the passenger's mobile device automatically after some predetermined time period. In either case, the passenger's mobile device may automatically transfer a payment reference to the driver's mobile device either in response to the passenger's approval or the passage of some predetermined time period.

Alternatively or in addition, the passenger's and/or driver's mobile devices may automatically transfer a record of the ride (including pick-up and drop-off locations) to the server of the ride service. In this case, a billing processor of the ride service may bill the passenger based upon previously provided payment information.

In another embodiment, the beacon within a human user's mobile device may be used to automatically provide or facilitate access by a human user to some predefined geographic area. This may be accomplished via the interaction between the beacon within the user's mobile device and one or more processors of a building automation system of a building (i.e., a "smart building").

In the case of a smart building, beacons near elevators may be provided to know or otherwise determine a user's preselected destination floor. Alternatively, the beacon may cause the user's device to automatically pull up or otherwise display elevator controls on the user's phone thereby allowing a user to manually select the user's destination floor on a smart building app when the user walks into the building in which the user works. Smart building or smart elevator management systems at a building entrance door creates or otherwise activates a beacon on the user's phone as the user enters a lobby of a building where the beacon is detected and where a corresponding set of applications display which elevator is best selected for the user. This may be accomplished via a set of continuously operating beacons near elevators. The user's device may also determine the closest or best elevator via the content of the associated beacon. This may be displayed on the user's device as the user approaches an elevator bank. Alternatively or in addition, detection of the elevator beacon may cause a processor of the user's mobile device to transmit its own destination beacon containing the user's destination or an identifier of the user from which the probable destination may be inferred.

In another embodiment, a user may have an appointment with a human client within a building and receive a schedule/calendar appointment invite (e.g., via e-mail) from the client. The schedule/calendar appointment invite may include floor and security credentials incorporated into beacon signals transmitted by the visitor's mobile device in order to allow access through gates and reception barriers (i.e., the visitor's mobile device operates as a proximity key card providing beacons via Bluetooth, WiFi or Near Field Communication (NFC)).

In another embodiment, a beacon may be provided within a user's mobile device for use within a smart home and/or smart office. In this case, the beacon transmitted from a user's mobile device may be used for tracking the user within an office in order to determine where workers are located at any one time and to know where they may be located in the event of a phone call or in an emergency. The system may have a graphic display of the location of each user presented on a receptionist's/security person's screen or mobile device. Multiple beacons throughout the office provide the granularity needed for providing the location of each worker on a screen.

This concept may also be provided through smart outlets in residential locations (Bluetooth, WiFi or the like). When all the people in the house leave the premises, the building automation system automatically detects the absence of the corresponding beacons and removes power from specified devices plugged into controlled outlets. The same scenario may be used with lights and mechanical equipment, where the detected absence of respective beacons causes the deactivation of such devices.

Similarly, the proximity of the mobile phone to a lock, door, etc. may be detected by the mobile device and used appropriately. In this case, the user's phone would see or otherwise detect a stationary beacon. The phone would then trigger a specific app on the phone to unlock the door or lock in question.

Smart workspace proximity (i.e. a mobile device proximate a cubicle, office, meeting room, etc.) may also trigger certain functions. For example, when the user's mobile device is not within a predetermined distance indicating proximity to the work space, a corresponding processor silences a desk phone, forwards a call to the user of the mobile device, or any other audible based device in the workspace contingent on predetermined settings. The absence of a beacon from the user's mobile device is also used to turn off lights or power within the workspace.

Similarly a secure workspace (i.e. cubicle, office, meeting room, etc.) may be facilitated by the user's beacon. For example, when the user's mobile device is not within predetermined distance indicating proximity to the work space, a corresponding processor locks cabinets, drawers and/or doors and unlocks the devices when the user is within a distance indicating proximity. Computer/server systems recognizing the beacon of nearby phones provides unlock credentials (i.e., automatically enters passwords) to provide authorized access to authorized users upon close proximity of the users. When a phone or mobile device's distance that would otherwise indicate proximity to computer/server system exceeds a predetermined distance it locks the computer/server or other device requiring user input to obtain secure access.

The providing of a beacon from a user's mobile device(s) may also be used within the context of the restaurant situation discussed above. In this case, a beacon of the user's phone located near a table of a restaurant may be used to open a control connection between the user's phone and a server of the restaurant where the user may use the connection to look at the menu, order food and/or receive a bill that is displayed directly on the user's phone. The control connection may also allow the user to split the bill with other users, call for a manager or request something from the kitchen. The control connection may be established with multiple phones based upon respective beacons and control connection or what have you. Seamless checkout may be accomplished through the user's phone via Apple Pay, Google Wallet, Paypal, EFT apps or other pay services and mobile devices. Once the cashier of the restaurant hits total, a processor of the restaurant server may send a total via the control connection to the user's phone. The customer is prompted to pay and will not have any reason to take anything out of their pocket or purse based upon the previously sent beacon or signal from the phone.

In another embodiment, third party processors connected to a restaurant or any other service provider may track the activities of a user. In this case, the processors may process beacon data of any of the services discussed above to track user purchases and locations visited based upon proximity to previously identified beacons. Apps that track and use the described beacon technology may provide data collection of anonymous or specific demographic data, behaviors, preferences, habits, etc. The resulting data can then be mined for commercial purposes and application to advertisements, coupons, etc.

In another embodiment, a beacon transmitted by a human service provider's phone can be used to monitor and track the location and duration of services. For example, a services check-in processor of a home automation system may monitor the activities of a services provider (e.g., a dog walker, cleaning person, caregiver, maintenance, etc.). Beacons transmitted by the service provider's mobile device in residential or commercial applications (WiFi or Bluetooth) and/or the professional person's app are used to keep track of who entered or left a location and/or duration of time at a particular location. The beacons may also be authenticated and used to provide temporary access at scheduled times by sending a control signal to automatic door locks.

In another embodiment, a beacon transmitted by a user's mobile device may be used in the context of interactive tourism. In this case, interactive tourism functionality could give information about a display or place of interest when the user's mobile device is within a predetermined distance indicating proximity. Museum interactive rooms or individual pieces of art/history or places of interest could include a processor that detects the user's phone. Every time the user's mobile device came near a unique beacon within that museum or place of interest it would trigger an audible or visual call up/cue in the processor that presents audible information. This feature is kind of like a guided tour without the guides.

In the example of the interactive tourist or any of the above examples, the beacon of a user's phone may be triggered by some other device. In this case, the phone/mobile device turns into a beacon signal (Bluetooth, WiFi, NFC) triggered by an app or another beacon signal (Bluetooth, WiFi, NFC).

In another example, a beacon at some event triggers a user's mobile device to pop up or otherwise display a previously purchased ticket to the event displayed on the user's screen at ticket taking locations such as stadiums, ballparks, theaters, airports or any other place that requires them. This could also link to a seat finders application or to a wayfinding system to help a user locate his/her seat as described above or by detecting nearby beacons that are highlighted on a map of the event shown on the user's device. Security in a particular section of the event are alerted and would otherwise know that a user is not in the correct seat since it would be able to read the beacon in the user's area via the user's device. This may also work by having multiple check points along the user's route.

In another embodiment, beacon transmitters may be provided as stand-alone devices. In this case, beacons could be used or otherwise embodied as security bracelets or other accessories for use by caregivers in tracking human patients. In this case, Amber Alerts or Silver Alerts may be used by the caregiver to activate nearby phones. If activated it turns nearby phones into receivers that pick up that particular individual person's location. In one embodiment, this information would only be transmitted to authorities. In other embodiments, this information may be transmitted to other authorized persons (e.g., nursing home, hospital, police, fire and rescue, etc.).

In general, the system of FIGS. 1-3 provides a system including plurality of wireless beacons at least one of which is carried by a wireless portable device, a wireless transceiver of the portable device that monitors a predetermined wireless spectrum and detects a signal from another of the plurality of wireless beacons, a processor of the portable device that decodes the detected beacon for an identifier including a sequence of bits, a processor of the portable device that correlates a content of the identifier with one of a plurality of programs of the portable device by matching the one or more bits of an identifier sequence of the one program with a content and location of one or bits of the identifier of the detected beacon and a processor of the portable device that interacts with another device that is directly physically adjacent the portable device via the beacon carried by the portable device and via execution of the one program. The system may operate within the context wherein the other device is another wireless portable device that carries the other beacon. The system may operate within the context wherein the other portable device is carried by an autonomous vehicle, taxi, Uber or Lyft driver.

The system may include a processor of the other portable device of the autonomous vehicle, taxi, Uber or Lyft driver that detects an identity of a user of the portable device via the beacon carried by the portable device and by operation of the one program and that detects a pickup location and drop-off location of the user of an autonomous vehicle, taxi, Uber or Lyft service by correlating detection of the beacons of the portable and other device with geographic locations. The system may operate within the context wherein the other device further comprises a building control system wherein the other beacon is located directly adjacent an elevator, where upon detecting the other beacon, the one program of the portable device identifies a user of the portable device to the building control system and the building control system or elevator controller automatically selects a destination floor of the user. The system may operate within the context wherein the other device further comprises a building control system wherein the other beacon is located directly adjacent an entry door of a secured location, wherein upon detecting the other beacon, the one program of the portable device identifies a user of the portable device to the building control system and the building control system activates a lock allowing physical entry of the user into the secured area. The system may operate within the context wherein the other device further comprises a building control system wherein the other beacon identifies a predetermined location within a building of the building control system, wherein upon detecting the other beacon; the portable device transmits an identifier of the other beacon to the control system and the building control system displays an indicator of the location of the portable device superimposed on a map of the building. The system may also include a processor of the building control system that activates or deactivates user devices based upon a presence or absence of the user within the building. The system may operate within the context wherein the activated and deactivated user devices further comprise one or more of lighting systems, mechanical systems, door locking systems, telephones, cabinet and drawer locks or computer and server systems.

The system may operate within the context wherein the other device further comprises a restaurant control system wherein the other beacon identifies a predetermined location within the restaurant, wherein upon detecting the other beacon, the one program of the portable device transmits an identifier of the other beacon to the restaurant control system and the restaurant control system determines a location of the portable device within the restaurant and establishes a control connection between the restaurant control system and portable device, the portable device performs one or more of presenting menus of the restaurant, receives orders for food, receives bills for the food and splits the received bill with users of other portable devices at the determined location wherein the control connection provides seamless checkout via Apple pay, Google wallet, Paypal and EFT app services via mobile devices wherein the user is prompted to pay and does not have to take anything out of his/her pocket or purse in order to pay based upon operation of the control connection. The system may also include a processor of the portable device that performs beacon data tracking including one or more of user purchases, locations visited by proximity to beacons and programs executing on the processor and that provide data mining of anonymous or specific demographic data, behaviors, preferences and habits.

The system may operate within the context wherein the other device further comprises a home automation system wherein the other beacon identifies a predetermined location of a home, wherein upon detecting the other beacon, the one program of the portable device transmits an identifier of the portable device to the home automation system and the home automation system establishes a control connection between the home automation system and portable device where the control connection provides a services check-in for one or more of a dog walker, cleaning person or maintenance person and wherein a least one of the home automation system and one program keeps track of who entered or left a location of the home, duration of time at a particular location and provides temporary access to the home at scheduled times using automated door locks.

The system may operate within the context wherein the other device further comprises an interactive tourism control system wherein the other beacon identifies a predetermined location at a tourist site, wherein upon detecting the other beacon, the one program of the portable device transmits an identifier of the other beacon to the interactive tourism control system and the interactive tourism control system determines a location of the portable device within the tourist site and establishes a control connection between the interactive tourism control system and portable device wherein the control connection provides information about a display or place of interest when a user is proximate the other beacon including museum interactive rooms or individual pieces of art or history or places of interest and wherein each time the portable device approaches the other beacon within the museum or place of interest, it triggers an audible or visual call up or cue for a guided tour without annoying human guides. The system may operate within the context wherein at least one of the beacon of the portable device and other device operates using at least one of Bluetooth, WiFi and NFC and wherein the beacon of the portable device is triggered by the one program or by the other beacon.

The system may operate within the context wherein the other device further comprises an entry control system of a public entertainment event wherein the other beacon identifies a predetermined geographic location of the public entertainment event, wherein upon detecting the other beacon, the one program of the portable device transmits an identifier of the other beacon to the entry control system, the entry control system determines a location of the portable device within the entertainment event and establishes a control connection between the entry control system and portable device wherein the portable device displays an entry ticket on a screen of the portable device at ticket taking locations including one or more of a stadium event, ballpark, a theater event an airport or any other place that requires a ticket and wherein an wayfinder control system helps a user locate an assigned seat at the event wherein a security portion of the event control system would know that the user were not in the assigned seat by reading other beacons in the area of the seat as well as beacons at multiple check points along a path to the seat.

The system may operate within the context wherein the other device further comprises a security bracelet worn by a person to generate Amber or Silver Alerts wherein upon detecting the other beacon, the one program of the portable device transmits an identifier and geographic location of the other beacon to at least one of a nursing home, private security service or public safety organization wherein the security bracelet turns nearby portable devices into a receiver that picks up and reports that person's individual location.

Alternatively, the system may also include a plurality of wireless beacons each of which is carried by a respective wireless portable device, a wireless transceiver of one of the portable devices that monitors a predetermined wireless spectrum and detects a signal from another beacon of another of the portable devices, a processor of the detecting portable device that decodes the detected beacon for an identifier including a sequence of bits, a processor of the detecting portable device that detects an identity of a user of the other portable device via the detected beacon and that detects an initial geographic location and final geographic location of proximity between a pair of portable devices by correlating detection and loss of signal from the beacon with geographic locations. The system may operate within the context wherein one of the detecting and other portable device further comprises a taxi, Uber or Lyft driver. The system may also include a program of a user of the taxi, Uber or Lyft service within one of the detecting and other portable device that automatically pays for travel services between the initial and final geographic locations.

Alternatively, the system may include a wireless beacon carried by a person with disabilities, a wireless transceiver of a portable device carried by a nearby human user that monitors a predetermined wireless spectrum and detects a signal from the wireless beacon, a processor of the portable device that decodes the detected beacon for an identifier including a sequence of bits, a processor of the portable device that correlates a content of the identifier with one of a plurality of programs of the portable device by matching the one or more bits of an identifier sequence of the one program with a content and location of one or bits of the identifier of the detected beacon and a processor of the portable device that reports a geographic location of the person with disabilities to a nursing home, private security service or public safety organization via execution of the one program.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A system comprising:
a plurality of wireless beacons at least one of which is carried by a wireless portable device;
a wireless transceiver of the portable device that monitors a predetermined wireless spectrum and detects a beacon from another of the plurality of wireless beacons;
a processor of the portable device that decodes the detected beacon for an identifier including a sequence of bits;
a processor of the portable device that correlates a content of the identifier with one of a plurality of programs of the portable device by matching the one or more bits of an identifier sequence of the one program with a content and location of one or more bits of the identifier of the detected beacon; and
a processor of the portable device that interacts with another device that is directly physically adjacent the portable device via the beacon carried by the portable device and via execution of the one program.

2. The system as in claim 1 wherein the another device is another wireless portable device that carries the detected beacon.

3. The system as in claim 2 wherein the another portable device is carried by an autonomous vehicle, taxi, Uber or Lyft driver.

4. The system as in claim 3 further comprising a processor of the another portable device of the autonomous vehicle, taxi, Uber or Lyft driver that detects an identity of a user of the portable device via the beacon carried by the portable device and by operation of the one program and that detects a pickup location and drop-off and drop off location of the user of an autonomous vehicle, taxi, Uber or Lyft service by correlating detection of the beacons of the portable and the another device with geographic locations.

5. The system as in claim 1 wherein the another device further comprises a building control system wherein the detected beacon is located directly adjacent an elevator, where upon detecting the detected beacon, the one program of the portable device identifies a user of the portable device to the building control system and the building control system or elevator controller automatically selects a destination floor of the user.

6. The system as in claim 1 wherein the another device further comprises a building control system wherein the detected beacon is located directly adjacent an entry door of a secured location, wherein upon detecting the detected beacon, the one program of the portable device identifies a user of the portable device to the building control system and the building control system activates a lock allowing physical entry of the user into the secured area.

7. The system as in claim 1 wherein the another device further comprises a building control system wherein the detected beacon identifies a predetermined location within a building of the building control system, wherein upon detecting the detected beacon, the portable device transmits an identifier of the detected beacon to the control system and the building control system displays an indicator of the location of the portable device superimposed on a map of the building.

8. The system as in claim 7 further comprising a processor of the building control system that activates or deactivates user devices based upon a presence or absence of the user within the building.

9. The system as in claim 8 wherein the activated and deactivated user devices further comprise one or more of lighting systems, mechanical systems, door locking systems, telephones, cabinet and drawer locks or computer and server systems.

10. The system as in claim 1 wherein the another device further comprises a restaurant control system wherein the detected beacon identifies a predetermined location within the restaurant, wherein upon detecting the detected beacon, the one program of the portable device transmits an identifier of the detected beacon to the restaurant control system and the restaurant control system determines a location of the portable device within the restaurant and establishes a control connection between the restaurant control system and portable device, the portable device performs one or more of presenting menus of the restaurant, receives orders for food, receives bills for the food and splits the received bill with users of other portable devices at the determined location wherein the control connection provides seamless checkout via Apple pay, Google wallet, Paypal or other EFT app services via mobile devices wherein the user is prompted to pay and does not have to take anything out of his/her pocket or purse in order to pay based upon operation of the control connection.

11. The system as in claim 10 further comprising a processor of the portable device that performs beacon data tracking including one or more of user purchases, locations visited by proximity to beacons and programs executing on the processor and that provide data mining of anonymous or specific demographic data, behaviors, preferences and habits.

12. The system apparatus as in claim 1 wherein the another device further comprises a home automation system wherein the detected beacon identifies a predetermined location of a home, wherein upon detecting the detected beacon, the one program of the portable device transmits an identifier of the portable device to the home automation system and the home automation system establishes a control connection between the home automation system and portable device where the control connection provides a services check-in for one or more of a dog walker, cleaning person or maintenance person and wherein a least one of the home automation system and one program keeps track of who entered or left a location of the home, duration of time at a particular location and provides temporary access to the home at scheduled times using automated door locks.

13. The system as in claim 1 wherein the another device further comprises an interactive tourism control system wherein the detected beacon identifies a predetermined location at a tourist site, wherein upon detecting the detected beacon, the one program of the portable device transmits an identifier of the detected beacon to the interactive tourism control system and the interactive tourism control system determines a location of the portable device within the tourist site and establishes a control connection between the interactive tourism control system and portable device wherein the control connection provides information about a display or place of interest when a user is proximate the detected beacon including museum interactive rooms or individual pieces of art or history or places of interest and wherein each time the portable device approaches the detected beacon within the museum or place of interest, the portable device triggers an audible or visual call up or cue for a guided tour without annoying human guides.

14. The system as in claim 1 wherein at least one of the beacon of the portable device and an other device operates using at least one of Bluetooth, WiFi and NFC and wherein the beacon of the portable device is triggered by the one program or by the detected beacon.

15. The system as in claim 1 wherein the another device further comprises an entry control system of a public entertainment event wherein the detected beacon identifies a predetermined geographic location of the public entertainment event, wherein upon detecting the detected beacon, the one program of the portable device transmits an identifier of the detected beacon to the entry control system, the entry control system determines a location of the portable device within the entertainment event and establishes a control connection between the entry control system and portable device wherein the portable device displays an entry ticket on a screen of the portable device at ticket taking locations including one or a stadium event, ballpark, a theater event an airport or any other place that requires a ticket and wherein an wayfinder control system helps a user locate an assigned seat at the event wherein a security portion of the event control system would know that the user were not in the assigned seat by reading other beacons in the area of the seat as well as beacons at multiple check points along a path to the seat.

16. The system as in claim 1 wherein the another device further comprises a security bracelet worn by a person to generate Amber or Silver Alerts wherein upon detecting the detected beacon, the one program of the portable device transmits an identifier and geographic location of the detected beacon to at least one of a nursing home, private security service or public safety organization wherein the security bracelet turns nearby portable devices into a receiver that picks up and reports that person's individual location.

17. A system comprising:
a plurality of wireless beacons each of which is carried by a respective wireless portable device;
a wireless transceiver of one of the portable devices that monitors a predetermined wireless spectrum and detects a beacon from another of the portable devices;
a processor of the detecting portable device that decodes the detected beacon for an identifier including a sequence of bits;
a processor of the detecting portable device that detects an identity of a user of the another portable device via the detected beacon and that detects an initial geographic location and final geographic location of proximity between a pair of portable devices by correlating detection and loss of signal from the detected beacon with geographic locations.

18. The system as in claim 17 wherein one of the detecting portable device and the another portable device further comprises an autonomous vehicle, taxi, Uber or Lyft driver.

19. The system as in claim 18 further comprising a program of a user of the autonomous vehicle, taxi, Uber or Lyft service within one of the detecting portable device and the another portable device that automatically pays for travel services between the initial and final geographic locations.

20. A system comprising:
a wireless beacon carried by a person with disabilities;
a wireless transceiver of a portable device carried by a nearby human user that monitors a predetermined wireless spectrum and detects the wireless beacon;
a processor of the portable device that decodes the detected beacon for an identifier including a sequence of bits;
a processor of the portable device that correlates a content of the identifier with one of a plurality of programs of the portable device by matching the one or more bits of an identifier sequence of the one program with a content and location of one or bits of the identifier of the detected beacon; and a processor of the portable device that reports a geographic location of the person with disabilities to a nursing home, private security service or public safety organization via execution of the one program.

\* \* \* \* \*